(12) United States Patent
Freund

(10) Patent No.: US 6,762,236 B2
(45) Date of Patent: Jul. 13, 2004

(54) CARBON BLACK, PROCESS FOR ITS PRODUCTION AND ITS USE

(75) Inventor: Burkhard Freund, Erftstadt (DE)

(73) Assignee: Degussa AG, Duesseldorf (DE)

( * ) Notice: Subject to any disclaimer, the term of this patent is extended or adjusted under 35 U.S.C. 154(b) by 276 days.

(21) Appl. No.: 10/073,345

(22) Filed: Feb. 13, 2002

(65) Prior Publication Data

US 2002/0156177 A1 Oct. 24, 2002

(30) Foreign Application Priority Data

Feb. 16, 2001 (DE) .......................................... 101 07 228

(51) Int. Cl.$^7$ .............................. C08K 3/04; C09C 1/48
(52) U.S. Cl. ....................... 524/495; 423/275; 423/449; 423/450
(58) Field of Search .......................... 524/495; 423/275, 423/449, 450

(56) References Cited

U.S. PATENT DOCUMENTS 6,391,274 B1 * 5/2002 Vogler et al. ............... 423/275

FOREIGN PATENT DOCUMENTS

| DE | 198 39 925 | 10/1999 |
| WO | WO 94/05732 | 3/1994 |

* cited by examiner

*Primary Examiner*—Kriellion A. Sanders
(74) *Attorney, Agent, or Firm*—Oblon, Spivak, McClelland, Maier & Neustadt, P.C.

(57) ABSTRACT

Carbon black with a CTAB surface area from about 10 to 35 $m^2/g$ and a DBP absorption from about 40 to 180 ml/100 g, the $\Delta D50$ value being at least 340 nm. The carbon black may be produced in a furnace-black reactor from a liquid carbon-black raw material and gaseous carbon-black raw material injected into a constriction in the reactor. Compared to other forms of carbon black, the carbon blacks of the present invention have advantageous properties, such as improved dispersibility, and may be economically and conveniently used in rubber mixtures, particularly in those used to produce extrusion profiles.

27 Claims, 1 Drawing Sheet

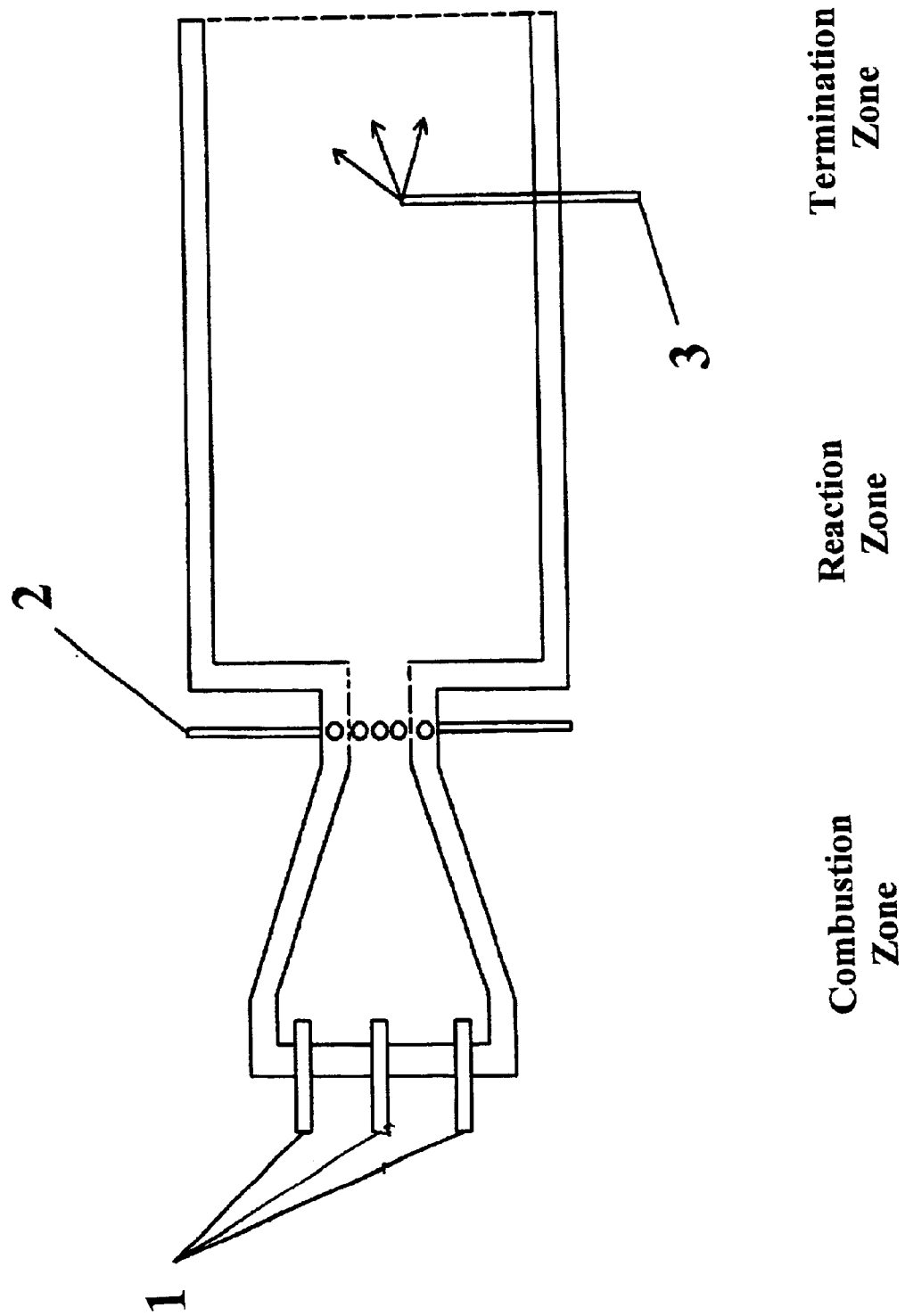

CARBON BLACK, PROCESS FOR ITS PRODUCTION AND ITS USE

BACKGROUND OF THE INVENTION

1. Field of the Invention

The invention relates to a more industrially and commercially advantageous form of carbon black and to processes for its production and use. Carbon black is a generic term for a class of particulate or powdery products composed essentially of elemental carbon. Carbon black is used principally as a filler or reinforcing agent in rubber, as a pigment, or for its electrically conductive properties. Carbon blacks may be categorized by their modes of production and by their physical characteristics, such as particle shape or size and their degree of aggregation or agglomeration. The carbon blacks of the present invention have a number of advantageous properties, including superior dispersibility, compared to conventional carbon blacks.

2. Description of Related Art

The carbon-black production processes that are most important industrially are based on the oxidative pyrolysis of carbonaceous carbon-black raw materials. In these processes the carbon-black raw materials are subjected to incomplete combustion at high temperatures in the presence of oxygen. This class of processes for producing carbon black includes, for example, the furnace-black process, the gas-black process and the flame-black process. Polynuclear aromatic carbon-black oils are predominantly employed as carbonaceous raw materials for the production of carbon-black.

Oxidative pyrolysis produces a stream of products including waste gases containing hydrogen and carbon monoxide and finely divided carbon black suspended in the waste gases. The carbon black is separated from the waste gas in a filtration plant. The carbon black thus prepared may be prepared for further processing by pelletization. Pelletization is usually performed using a wet or dry granulating process and produces pelletized black. Additionally, a conclusive drying operation may be used to reduce the moisture content of the carbon black to below 1 wt. %.

Over 90% of the carbon blacks produced industrially are employed as fillers and as reinforcing agents in the production of rubber mixtures. For instance, one important application for such rubber mixtures is in the production of highly-filled profiled joints in automobile manufacture. Typical rubber mixtures of such a type contain 20 to 40 wt. % synthetic rubber, preferably EPDM, 20 to 50 wt. % carbon black, mineral oil and further auxiliary substances. Such rubber mixtures may also contain sulfur or peroxides as vulcanizing agents.

The properties of manufactured products, such as profiled joints, are influenced by the specific properties of the carbon black component. For instance, the choice of a carbon black influences the viscosity of, the injection speed, the swelling after extrusion, the filler dispersion, the hardness, the compression set and many other properties of a rubber or synthetic rubber mixture used in the manufacture a profiled joint. Economical and convenient production of such products demand a form of carbon black that provides low swelling after extrusion, a high injection speed and a good dispersibility at given hardness.

An important variable influencing the functional properties of such mixtures is the specific surface area of a carbon black, in particular, the CTAB surface area, which is a measure of the rubber-effective surface portion of the carbon black. Injection speed and dispersibility rise with diminishing CTAB surface area.

Other important carbon-black parameters are the DBP absorption as a measure index for the initial structure and the 24M4-DBP absorption as a measure of the residual structure still remaining after mechanical stressing of the carbon black. High DBP values result in good dispersibility and low swelling after extrusion. Characterization of carbon black using CTAB surface area or DBP absorption, as well as other conventional parameters or test methods, is described by *The Kirk-Othmer Encyclopedia of Chemical Technology*, $4^{th}$ edition (1992), vol. 4, pages 1037–1074.

Carbon blacks that exhibit CTAB surface areas between 10 and 50 $m^2/g$ and DBP absorption values between 80 and 160 ml/100 g are suitable for profile mixtures.

Furnace blacks with a low iodine number and high DBP values are known from EP 0609433.

Among the disadvantages of the known carbon blacks is their poor dispersibility and poor processability during manufacturing processes. While such carbon blacks may have low specific surface areas and high structure, the increasingly critical formulations based on partially crystalline EPDM types and, conditioned by economic considerations, the increasingly shorter mixing-times, highlight the need for a more dispersible and conveniently processed form of carbon black.

BRIEF SUMMARY OF THE INVENTION

Accordingly, one object of the present invention is to provide a carbon black that is more easily and economically dispersed and processed for industrial and commercial applications, especially in the production of rubber-profile mixtures. Other objects of the invention include provision of a form of carbon black that reduces swelling of a rubber mixture after extrusion, a form of carbon black that permits more rapid extrusion of a rubber mixture, and/or a form of carbon black that permits high filler loadings in a rubber mixture. Other objects of the invention include processes for making the above-mentioned forms of carbon black and products or compositions comprising such carbon blacks. Additionally, still other objects of the invention will be evident from the following description.

BRIEF DESCRIPTION OF THE DRAWING

The FIGURE shows a longitudinal section through the furnace reactor. The combustion chamber is shown on the left side of the drawing and the reaction chamber on the right. Reference number (1) shows apertures in the front wall of the combustion chamber that control the supply of the combustion air and of fuel. Reference number (2) depicts the position of one or more radial lance(s) through which carbon-black raw material is injected into the constriction. Reference number (3) depicts a lance through which quenching water is sprayed into the termination zone of the reaction chamber.

DETAILED DESCRIPTION OF THE INVENTION

The invention provides a superior and more advantageous form of carbon black with a CTAB surface area from about 10 to 35 $m^2/g$, preferably from about 10 to 30 $m^2/g$, and a DBP absorption from about 40 to 180 ml/100 g, preferably about 70 to 160 ml/100 g, said carbon black being characterized in that the ΔD50 value of the aggregate-size distribution is at least about 340 nm, preferably at least about 400 nm, in particularly preferred manner at least about 500 nm. All values of the aggregate-size distribution relate to the weight distribution.

The M value (quotient formed from $D_W$ and $D_{mode}$) of the aggregate-size distribution may be at least 2, preferably at least 2.15, in a particularly preferred manner at least 2.3. The standard deviation of the aggregate-size distribution may be at least about 300 nm. The D75%/25% ratio of the aggregate-size distribution may be at least 2.4. The ΔDBP/DBP ratio may be at least 0.24, preferably at least 0.35, in a particularly preferred manner at least 0.45.

The $$\text{The } \frac{\Delta DBP \cdot 100}{DBP^2} \text{ ratio may be at least}$$

0.29 (ml/100 g)$^{-1}$, preferably at least 0.30 (ml/100 g)$^{-1}$. The carbon blacks may be furnace blacks.

The invention also provides a process for producing these more advantageous forms of carbon black in a furnace-black reactor which contains along the reactor axis a combustion zone, a reaction zone and a termination zone, by generating a stream of hot waste gas in the combustion zone as a result of complete combustion of a fuel in a gas containing oxygen and by channelling the waste gas from the combustion zone through the reaction zone into the termination zone, mixing a carbon-black raw material into the hot waste gas in the reaction zone and stopping the formation of carbon black in the termination zone by spraying in water, said process being characterized in that a liquid carbon-black raw material (e.g. oil or a liquid hydrocarbon) and a gaseous carbon-black raw material (e.g. a gaseous hydrocarbon) are injected in the constriction. As depicted in the FIGURE, the carbon-black raw materials may be injected by means of radial lances (2). Use may be made of 2–64, preferably 8–32, in a particularly preferred manner 12–16 radial lances. The ratio of oil radial lances to gas radial lances may amount to 4:1 to 1:4, preferably 1:1. The oil lances and gas lances may be arranged in alternating manner. The depth of penetration of oil radial lances and gas radial lances may be variable.

The liquid carbon-black raw material can be atomized by pressure, vapor, compressed air or by the gaseous carbon-black raw material.

In a preferred manner both the gaseous carbon-black raw material and the liquid carbon-black raw material can be introduced simultaneously at the constriction.

As a result of this, portions that are formed from the gas and portions that are formed from the liquid are found in the carbon black.

Surprisingly, the use of relatively small quantities of gas by way of raw material in the constriction brings about a distinct lowering of the specific surface area of the carbon black produced. Specific surface areas less than 20 m$^2$/g can consequently be produced in accordance with the invention relatively simply and in a grit-free manner with moderate amounts of oil. In addition, natural gas can bring about a particularly broad aggregate-size distribution compared with carbon-black oil, as a consequence of different pyrolysis kinetics.

The "K factor" is used as an index number for the purpose of characterizing the excess of air. The K-factor is the ratio of the quantity of air required for a stoichiometric combustion of the fuel to the quantity of air actually supplied to the combustion stage. Accordingly, a K-factor of 1 signifies a stoichiometric combustion. In the case of excess of air the K-factor is less than 1. As in the case of known carbon blacks, K-factors between 0.2 and 0.9 can be employed. Working can preferably take place with K-factors between 0.2 and 0.5.

Suitable liquid or gaseous carbon-black raw materials may be used for the production of the carbon black of the present invention. Liquid carbon-black raw materials that may be employed include liquid aliphatic or aromatic, saturated or unsaturated hydrocarbons or mixtures thereof, distillates arising from coal tar, or residual oils that arise in the course of the catalytic cracking of petroleum fractions or in the course of the production of olefins by cracking of naphtha or gas oil. Gaseous carbon-black raw materials that may be employed include gaseous aliphatic, saturated or unsaturated hydrocarbons, mixtures thereof or natural gas. Other suitable raw materials for carbon black production may be selected by one with skill in the art. Such raw materials are also described by *The Kirk-Othmer Encyclopedia of Chemical Technology*, 4$^{th}$ edition (1992), vol. 4, pages 1037–1074.

Moreover, the process for producing carbon blacks that has been described is not restricted to a particular reactor geometry. On the contrary, it can be adapted to various types and sizes of reactor.

Both pure pressure atomizers (single-component atomizers) and two-component atomizers with internal or external mixing can be employed as atomizers for the carbon-black raw material, whereby the gaseous carbon-black raw material can be used by way of atomizing medium. Accordingly, the combination described above of a liquid carbon-black raw material with a gaseous carbon-black raw material can, for example, be realized by using the gaseous carbon-black raw material as an atomizing medium for the liquid carbon-black raw material.

Two-component atomizers can be employed for the purpose of atomizing liquid carbon-black raw material. In single-component atomizers a change in the throughput may also lead to a change in the droplet size. In two-component atomizers the droplet size can be influenced largely independently of the throughput.

Carbon-black oil and gaseous hydrocarbon raw materials may be injected into the stream of hot waste gas simultaneously. These materials may be injected together or may be separately injected through different sets of gas lances. For instance, methane may be injected through one set of lances and carbon black oil through another set of lances.

The carbon black according to the invention can be used as a reinforcing carbon black in rubber mixtures, particularly for extrusion profiles.

The invention further provides rubber mixtures that are characterized in that they contain rubber or synthetic rubber, the carbon black according to the invention, optionally precipitated silica, organosilane and/or further rubber auxiliaries.

Besides natural rubber, synthetic rubbers are also suitable for the production of rubber mixtures according to the invention. The term "rubber" as used herein, unless otherwise specified, may refer to either natural or synthetic rubber, or both. Preferred synthetic rubbers are described, for example, by W. Hofmann, Kautschuktechnologie, Genter Verlag, Stuttgart 1980 or by *The Kirk-Othmer Encyclopedia of Chemical Technology*, 4$^{th}$ edition (1992), vol. 21, pages 481–562. These comprise, inter alia, polybutadiene (BR)

polyisoprene (IR)

styrene/butadiene copolymers with styrene contents from 1 to 60, preferably 5 to 50 wt. % (SBR)

isobutylene/isoprene copolymers (IIR)

butadiene/acrylonitrile copolymers with acrylonitrile contents from 5 to 60, preferably 10 to 50 wt. % (NBR)

ethylene/propylene/diene copolymers (EPDM)

as well as mixtures of these rubbers.

Suitable auxiliaries are known in the rubber industry and are described, for instance, by *The Kirk-Othmer Encyclopedia of Chemical Technology*, 4$^{th}$ edition (1992), vol. 21, pages 481–562. Accordingly, the rubber or synthetic rubber mixtures according to the invention may contain further rubber auxiliary products such as, inter alia, reaction accelerators, reaction retarders, anti-ageing agents, stabilizers, processing aids, plasticizers, waxes, metal oxides and also activators such as triethanolamine, polyethylene glycol, and hexanetriol.

The rubber auxiliaries are employed in conventional quantities, which depend, inter alia, upon the intended use. Conventional quantities are, for example, quantities from 0.1 to 50 wt. %, relative to rubber.

Sulfur, organic sulfur donors or radical-formers may serve as cross-linkers. The rubber mixtures according to the invention may furthermore contain vulcanization accelerators.

Examples of suitable vulcanization accelerators are mercaptobenzothiazoles, sulfenamides, guanidines, thiurams, dithiocarbamates, thioureas and thiocarbonates. The vulcanization accelerators and cross-linkers can be employed in quantities from 0.1 to 10 wt. %, preferably 0.1 to 5 wt. %, relative to rubber.

The blending of the rubbers with the filler, optionally with rubber auxiliaries and the organosilane, can be carried out in conventional mixing units such as rollers, internal mixers and mixing extruders. Ordinarily such rubber mixtures are produced in internal mixers, whereby firstly the rubbers, the carbon black according to the invention, optionally the silica and the organosilane and the rubber auxiliaries are mixed in at 100 to 170° C. in one or more successive thermomechanical mixing stages. In this connection the sequence of addition and the time of addition of the individual components can have a decisive effect on the properties of the mixture that are obtained. The rubber mixture that is obtained in this way is then ordinarily added to the cross-linking chemicals in an internal mixer or on a roller at 40–110° C. and is processed into the so-called green compound for the subsequent process steps such as, for example, shaping and vulcanization.

Vulcanization of the rubber mixtures according to the invention can be effected at temperatures from about 80 to 200° C., preferably 130 to 180° C., optionally under pressure from about 10 to 200 bar.

The rubber mixtures according to the invention are suitable for producing moldings, for example for the production of pneumatic tires, tire treads, cable sheaths, hoses, drive belts, conveyor belts, roll covers, tires, shoe soles, gaskets, profiles and attenuators.

The carbon black of the present invention may also be incorporated into plastics.

The carbon black of the present invention may also be incorporated into products such as construction, flooring or roofing products, clothing or footwear, electrical components or conductors, batteries, semiconductors, or electrical shielding. It may also be employed as an ingredient in a recording medium, a paper product or in a pigment, tint, ink, or paint or other similar products.

The carbon black according to the invention has the advantages of improved dispersion, reduced swelling after extrusion and improved economic efficiency by virtue of high filler loadings.

The carbon blacks according to the invention are distinguished by particularly favorable dispersion behavior in low-viscosity rubber mixtures.

EXAMPLE A

Example A refers to reactor parameters useful for producing carbon blacks of the present invention. The following tabulation and Table 1 show examples of reactor parameters useful for producing the carbon blacks of the present invention. One type of reactor for producing these carbon blacks is depicted in the FIGURE. The FIGURE shows a longitudinal section through the furnace reactor. The carbon-black reactor has a combustion chamber in which the hot process gas for the pyrolysis of the carbon-black oil is generated by combustion of natural gas subject to supply of an excess of atmospheric oxygen. Supply of the combustion air and of the fuel is effected via the apertures (1) in the front wall of the combustion chamber. The combustion chamber tapers conically towards the constriction. The carbon-black raw material is injected in the constriction via one or more radial lances (2). After passing through the constriction, the reaction-gas mixture expands into the reaction chamber. In the termination zone, water is sprayed in through one or more quenching-water lances (3).

The dimensions of the reactors that may be used can be gathered from the following tabulation:

|  | I | II |
|---|---|---|
| Largest diameter of combustion chamber: | 930 mm | 1143 mm |
| Length of combustion chamber as far as constriction: | 2127 mm | 1985 mm |
| Length of conical part of combustion chamber: | 1307 mm | 1180 mm |
| Diameter of constriction: | 114 mm | 260 mm |
| Length of constriction: | 80 mm | 320 mm |
| Diameter of reaction chamber: | 875 mm | 1400 mm |
| Maximal position of quenching-water lance(s)[1] | 9705 mm | 14750 mm |

[1]measured from the inlet into the constriction (+: after inlet, −: before inlet)

With a view to producing the carbon blacks according to the invention, natural gas and a carbon-black oil with a carbon content of 91.3 wt. % and a hydrogen content of 7.87 wt. % are advantageously employed as fuel.

Table 1 shows the reactor parameters used for the production of the carbon blacks according to the invention. Six different carbon blacks were produced—carbon blacks R1 to R6. The production conditions differ in particular with respect to the quantity of the carbon-black oil and natural gas injected in the constriction. The carbon blacks that were produced were pelletized wet in accordance with the conventional processes prior to characterization and incorporation into a rubber mixture.

TABLE 1

| Reactor | | I | | | | II | |
|---|---|---|---|---|---|---|---|
| Reactor parameter | Unit | R1 | R2 | R3 | R4 | R5 | R6 |
| Combustion air | Nm³/h | 1800 | 1800 | 1800 | 1800 | 6800 | 5300 |
| Temperature of combustion air | °C. | 492 | 490 | 496 | 520 | 640 | 520 |
| Fuel (natural gas) | Nm³/h | 67 | 67 | 67 | 67 | 108 | 155 |
| Carbon-black oil | kg/h | 730 | 830 | 675 | 780 | 3950 | 3150 |
| Temperature of carbon-black oil | °C. | 148 | 116 | 118 | 121 | 170 | 170 |
| Natural gas in the constriction | Nm³/h | 10 | 10 | 10 | 10 | 140 | 160 |
| Additive ($K_2CO_3$) | g/h | — | — | 15 | — | — | — |
| Quenching position[1] | mm | 9705 | 8290 | 9705 | 8290 | 14750 | 14750 |

[1] Measured from the inlet into the constriction.

Table 2 below shows analytical characteristic data of the carbon blacks that were produced are ascertained in accordance with the following Standards:

| | |
|---|---|
| CTAB surface area: | ASTM D 3765 |
| Iodine number | ASTM D 1510 |
| STSA | ASTM D 4820/5816 |
| DBP absorption: | ASTM D 2414 |
| 24M4-DBP absorption: | ASTM D 3493 |

The ΔDBP value is calculated by subtracting the 24M4-DBP absorption value from the DBP absorption value.

For the purpose of measuring the aggregate-size distribution curves, use is made of a BI-DCP disc centrifuge with red-light diode manufactured by Brookhaven. This instrument is being specially developed for the determination of aggregate-size distribution curves of finely divided solids from extinction measurements and is equipped with an automatic measuring and evaluating program for ascertaining the aggregate-size distribution.

With a view to carrying out the measurements, firstly a dispersion solution is produced consisting of 200 ml of ethanol, 5 drops of ammonia solution and 0.5 g of Triton X-100 and topping up to 1000 ml with demineralized water. Moreover, a spinning liquid is prepared consisting of 0.5 g of Triton X-100, 5 drops of ammonia solution and topping up to 1000 ml with demineralized water.

Then 20 mg of carbon black are added to 20 ml of dispersion solution and are suspended in the solution in a cooling bath for a period of 4.5 minutes with an ultrasonic power of 100 Watts (80% pulses).

Before the start of the actual measurements the centrifuge is operated for 30 minutes at a speed of 11,000 min$^{-1}$. 1 ml of ethanol is injected into the revolving disk and then 15 ml of spinning liquid are carefully added to form a lower layer. After about one minute, 250 μl of the carbon-black suspension are injected and the measuring program of the instrument is started and the spinning liquid in the centrifuge is covered with a layer of 50 μl of dodecane. A double determination of each sample to be measured is carried out.

The evaluation of the raw-data curve is then undertaken by the calculating program of the instrument, taking the scattered-light correction into account and with automatic base-line adaptation.

The ΔD50 value is the width of the aggregate-size distribution curve at one half of the peak height. The $D_W$ value is the weight average of the aggregate-size distribution. The $D_{mode}$ value is the aggregate size with the greatest frequency (peak maximum of the aggregate-size distribution curve).

The M value is the quotient formed from $D_W$ and $D_{mode}$. The D75%/25% ratio is calculated from the quotient of the particle diameter at which 75% of the particles are smaller and 25% of the particles are larger and the particle diameter at which 25% of the particles are smaller and 75% are larger, relative to the cumulative-weight aggregate-size distribution.

TABLE 2

| | | I | | | | II | |
|---|---|---|---|---|---|---|---|
| Carbon black | | R1 | R2 | R3 | R4 | R5 | R6 |
| CTAB | m²/g | 20 | 17 | 19 | 25 | 18 | 18 |
| Iodine number | mg/g | 18 | 16 | 16 | 24 | 14 | 14 |
| STSA | m²/g | 19 | 16 | 18 | 24 | 16 | 16 |
| DBP | ml/100 g | 141 | 118 | 79 | 149 | 131 | 138 |
| CDBP | ml/100 g | 76 | 76 | 60 | 79 | 73 | 75 |
| ΔDBP | ml/100 g | 65 | 42 | 19 | 70 | 68 | 73 |
| ΔDBP/DBP | | 0.46 | 0.36 | 0.24 | 0.47 | 0.52 | 0.53 |
| $\frac{\Delta DBP \times 100}{DBP^2}$ | (ml/100 g)$^{-1}$ | 0.33 | 0.30 | 0.30 | 0.32 | 0.40 | 0.38 |
| $D_w$ | nm | 523 | 555 | 558 | 429 | 511 | 497 |
| $D_{mode}$ | nm | 153 | 161 | 317 | 195 | 223 | 213 |
| M value | | 3.42 | 3.45 | 2.2 | 2.94 | 2.29 | 2.33 |
| ΔD50 | nm | 576 | 621 | 512 | 437 | 398 | 350 |
| s | nm | 307 | 326 | 287 | 267 | 304 | 317 |
| D 75%/25% | | 2.54 | 2.57 | 2.58 | 2.48 | 2.45 | 2.49 |

EXAMPLE B

Example B, Tables 3–5, below show the superior properties, such as improved dispersibility, of rubber mixtures produced with the carbon black of the present invention compared to rubber mixtures produced with conventional carbon black.

Rubber mixture "C1" shown in Table 3 below contains conventional carbon black "Reference Black 1", whereas rubber mixture "C2" contains Carbon Black R1 of the present invention. Reference black 1 has an Iodine number of 21.7 mg/g, CTAB of 24.3 m²/g, DBP of 115.9 ml/100 g, CDBP of 78.0 ml/100 g and a ΔD50 Value of 296 nm. Carbon Black R1 is described in Table 2 above.

The recipe used for these rubber mixtures is given in the Table 3 below. The unit phr means part by weight per 100 parts of the crude rubber employed. The general process for the preparation of rubber mixtures and vulcanization products thereof is described in the following book: "Rubber Technology Handbook", W. Hofmann, Hanser Verlag (1994).

TABLE 3

| Substance | C1 (phr) | C2 (phr) |
|---|---|---|
| 1st Stage | | |
| Buna EP G 5455 | 150 | 150 |
| Reference Black 1 | 130 | — |
| Carbon Black R1 | — | 130 |
| ZnO | 5 | 5 |
| Stearic Acid | 2 | 2 |
| Lipoxol 4000 (PEG) | 5 | 5 |
| Paraffinic Oil | 50 | 50 |
| 2nd Stage | | |
| Batch Stage 1 | | |
| MBT | 1 | 1 |
| TBzTD | 1.2 | 1.2 |
| Renocure TP/S | 2 | 2 |
| Sulfur | 1.5 | 1.5 |

The polymer EP G 5455 from Bayer AG is an EPDM polymer. Reference Black 1 is EB 160, a conventionally produced furnace carbon black from Degussa AG.

Lipoxol 400 (PEG) from Huels AG is a polyethylene glycol activator. Paraffinic Oil from Sun Oil Company (Belgium) N.V. is a plasticizer oil.

MBT (Vulkacit Mercapto C) from Bayer AG is a vulcanization accelerator.

TBzTD (PerKacit TBzTD) from Akzo Chemie GmbH is a secondary vulcanization accelerator.

Renocure TP/S from Rhein Chemie Rheinau GmbH is a vulcanizing accelerator.

The rubber mixtures are prepared in an internal mixer in accordance with the mixing instructions in Table 4.

TABLE 4

| Stage 1 | |
|---|---|
| Settings | |
| Mixing unit | Werner & Pfleiderer GK 1,5 E |
| Speed | 60 min$^{-1}$ |
| Plunger pressure | 5.5 bar |
| Empty volume | 1.58 L |
| Filling level | 0.56 |
| Flow temp | 70° C. |
| Mixing operation Stage 1 | |
| 0 to 1 min | Buna EP G 5455, Carbon black, ZnO, stearic acid, paraffinic oil |
| 1 min | clean, Lipoxol 4000 |
| 1 to 5 min | mix |
| 5 min | dump |
| Batch temp. | 110–130° C. |
| Storage | 24 h at room temperature |
| Stage 2 | |
| Settings | |
| Mixing unit | Werner & Pfleiderer GK 1,5 E |
| Speed | 50 min$^{-1}$ |
| Plunger pressure | 5.5 bar |
| Empty volume | 1.58 L |
| Filling level | 0.54 |
| Flow temp | 70° C. |
| Mixing operation Stage 2 | |
| 0 to 2 min | Batch step 1, MBT, TBzTD, sulfur, Rhenocure TP/S |
| 2 min | dump |
| Batch temp. | 90–105° C. |

TABLE 5

| Physical testing | Standard/Conditions |
|---|---|
| ML 1 + 4, 100° C. | DIN 53523/3, ISO 667 |
| Tensile test on ring, 23° C. | DIN 53504, ISO 37 |
| Tensile strength (MPa) | |
| Moduli (MPa) | |
| Elongation at break (%) | |
| Shore A hardness, 23° C. (SH) | DIN 53 505 |
| Ball rebound, 23° C. (%) | ASTM D 5308 |
| Dispersion Phillps () | ISO/DIS 11345 |
| Dispersion roughness/topography | according to DE-PS 19917975 |

Table 6 compares reference mixture C1 to inventive mixture C2 that comprises carbon black R1 according to the invention. Table 6 shows the results of rubber testing of these mixtures. All mixtures were vulcanized at 170° C. for 12 minutes.

TABLE 6

| | | C1 (reference) | C2 (invention) |
|---|---|---|---|
| ML (1 + 4) | (MU) | 48 | 49 |
| Shore A hardness | (SH) | 56 | 45 |
| Tensile strength | (MPa) | 8.7 | 8.2 |
| Modulus 100% | (MPa) | 2.3 | 2.1 |
| Modulus 300% | (MPa) | 7.3 | 6.7 |
| Elongation at break | (%) | 380 | 390 |
| Ball rebound | (%) | 59.3 | 60.1 |
| Dispersion Phillips | () | 6 | 8 |
| Dispersion roughness/topography | | | |
| Ra | [µm] | 0.764 | 0.234 |
| Pc | [1/cm] | 30 | 1 |
| Number of Peaks 2–5 µm | [—] | 224 | 16 |
| Number of Peaks 5–10 µm | [—] | 71 | 5 |
| Number of Peaks 10–15 µm | [—] | 10 | 0 |
| Number of Peaks >15 µm | [—] | 5 | 0 |
| Peak area | [%] | 9 | 0.8 |

As can be seen clearly from the data in Table 6, the dispersion of rubber compound C2 comprising the carbon black according to the invention is significantly improved above that of the reference rubber compound C1 containing conventional carbon black.

Incorporation by Reference

Each document, patent application or patent publication cited by or referred to in this disclosure is incorporated by reference in its entirety. Any patent document to which this application claims priority is also incorporated by reference in its entirety. Specifically, priority document Germany 101 07 228.7, filed Feb. 16, 2001, is hereby incorporated by reference.

Modifications and Other Embodiments

Various modifications and variations of the described carbon black compounds, compositions and methods of their production or use, as well as the concept of the invention will be apparent to those skilled in the art without departing from the scope and spirit of the invention. Although the invention has been described in connection with specific preferred embodiments, it should be understood that the invention as claimed is not intended to be limited to such specific embodiments. Various modifications of the described modes for carrying out the invention which are obvious to those skilled in the manufacturing, industrial, chemical and chemical engineering arts, or in related fields are intended to be within the scope of the following claims.

What is claimed is:

1. Carbon black having:
   a CTAB surface area from about 10 to 35 m²/g and
   a DBP absorption from about 40 to 180 ml/100 g,
   wherein the ΔD50 value of the aggregate-size distribution is at least about 340 nm.

2. The carbon black of claim 1 that has an M value of the aggregate-size distribution of 2 or more.

3. The carbon black of claim 1 that has a standard deviation of the aggregate-size distribution of at least 300 nm.

4. The carbon black of claim 1 that has a D75%/25% ratio of the aggregate-size distribution is 2.4 or more.

5. The carbon black of claim 1 that has a ΔDBP/DBP ratio of 0.35 or more.

6. The carbon black of claim 1 that has:

a $\frac{\Delta DBP \cdot 100}{DBP^2}$ ratio at least 0.29 (ml/100 g)$^{-1}$.

ratio at least 0.29 (ml/100 g)$^{-1}$.

7. A rubber or synthetic rubber mixture comprising the carbon black of claim 1 and optionally precipitated silica, organosilane, and/or one or more rubber auxiliary(s).

8. The rubber or synthetic rubber mixture of claim 7 that is a molded or extruded product.

9. An extrusion profile comprising the carbon black of claim 1.

10. A profiled joint comprising the carbon black of claim 1.

11. A product comprising the carbon black of claim 1 selected from the group consisting of a pneumatic tire, tire tread, cable sheath, hose, drive belt, conveyor belt, roll cover, tire, shoe sole, gasket, profile and attenuator.

12. The rubber or synthetic rubber product of claim 8 that is a tire, tread, or tire or tread component.

13. Clothing or footwear comprising the carbon black of claim 1.

14. A construction, flooring or roofing product comprising the carbon black of claim 1.

15. A plastic comprising the carbon black of claim 1.

16. An electrical component, electrical conductor, battery, semiconductor, or electrical shielding comprising the carbon black of claim 1.

17. A recording medium comprising the carbon black of claim 1.

18. A pigment, tint, ink or paint comprising the carbon black of claim 1.

19. A paper product comprising the carbon black of claim 1.

20. A process for producing a rubber or synthetic rubber mixture comprising admixing a rubber or synthetic rubber and the carbon black of claim 1.

21. A process for reinforcing a rubber or synthetic rubber product comprising adding the carbon black of claim 1 to a rubber or synthetic rubber mixture forming said product.

22. The method of claim 21, wherein said rubber product is an extrusion profile.

23. A process for producing carbon black having:
    a CTAB surface area from about 10 to 35 m²/g and
    a DBP absorption from about 40 to 180 ml/100 g,
    wherein the ΔD50 value of the aggregate-size distribution is at least about 340 nm comprising:
    generating a stream of hot waste gas in the combustion zone of a furnace-black reactor having a combustion zone, a constriction, a reaction zone and a termination zone,
    channeling the hot waste gas from the combustion zone through the constriction into the reaction zone,
    mixing one or more liquid and one or more gaseous carbon-black raw material(s) into the stream of hot waste in the constriction for a time and under conditions effective for the formation of carbon black,
    spraying water in the termination zone to stop the formation of carbon black and
    recovering the carbon black.

24. The process for producing the carbon black of claim 23, wherein the carbon-black raw materials are injected into the constriction by means of one or more radial lance(s).

25. The process of claim 23, wherein the gaseous carbon black raw material and the liquid carbon black raw material are introduced through separate lances.

26. The process of claim 23, further comprising pelletizing and/or drying the recovered carbon black.

27. Carbon black produced by the process of claim 23.

* * * * *